United States Patent
Furman et al.

(10) Patent No.: US 7,352,795 B2
(45) Date of Patent: Apr. 1, 2008

(54) SYSTEM AND METHOD FOR COMMUNICATING DATA USING CONSTANT AMPLITUDE WAVEFORM WITH HYBRID ORTHOGONAL AND MSK OR GMSK MODULATION

(75) Inventors: William N. Furman, Fairport, NY (US); John W. Nieto, Rochester, NY (US); Michael A. Wadsworth, Palmyra, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/121,618

(22) Filed: May 4, 2005

(65) Prior Publication Data

US 2006/0251150 A1    Nov. 9, 2006

(51) Int. Cl.
*H04B 1/707* (2006.01)
*H04L 27/10* (2006.01)
*H04L 27/12* (2006.01)

(52) U.S. Cl. .............. 375/142; 375/144; 375/146; 375/274; 375/305

(58) Field of Classification Search .............. 375/130, 375/150, 144, 259, 142, 146, 148, 274, 305, 375/336; 370/342; 714/752; 332/10
See application file for complete search history.

(56) References Cited

U.S. PATENT DOCUMENTS

| | | | |
|---|---|---|---|
| 4,516,087 A | 5/1985 | Bruene | 332/17 |
| 4,622,683 A | 11/1986 | Basham et al. | 375/90 |
| 5,329,547 A * | 7/1994 | Ling | 370/342 |
| 5,341,396 A * | 8/1994 | Higgins et al. | 375/130 |
| 5,768,307 A * | 6/1998 | Schramm et al. | 375/150 |
| 5,815,531 A | 9/1998 | Dent | 375/298 |
| 5,867,059 A | 2/1999 | Huang et al. | 329/302 |
| 6,201,451 B1 | 3/2001 | Hata | 332/100 |
| 6,603,818 B1 | 8/2003 | Dress, Jr. et al. | 375/295 |
| 6,680,983 B2 | 1/2004 | Happonen | 375/316 |
| 6,944,206 B1 * | 9/2005 | Dent | 375/144 |
| 2002/0146080 A1 | 10/2002 | Dress, Jr. et al. | 375/316 |
| 2003/0165199 A1 | 9/2003 | Huang | 375/265 |
| 2005/0031044 A1 * | 2/2005 | Gesbert et al. | 375/259 |
| 2005/0100077 A1 * | 5/2005 | Rosen et al. | 375/130 |
| 2006/0095827 A1 * | 5/2006 | Spencer et al. | 714/752 |

\* cited by examiner

*Primary Examiner*—Don N Vo
(74) *Attorney, Agent, or Firm*—Allen, Dyer, Doppelt, Milbrath & Gilchrist, P.A.

(57) ABSTRACT

A communications system of the present invention includes a transmitter that is operative for combining an orthogonal Walsh modulation with a minimum shift keying or Gaussian minimum shift keying waveform to form a hybrid communications signal that carries communications data over a constant amplitude waveform that is spread in time and frequency. This communications signal can be transmitted to a RAKE receiver that has a plurality of correlators with output weights formed for processing this hybrid communications signal.

24 Claims, 5 Drawing Sheets

SYSTEM AND METHOD FOR COMMUNICATING DATA USING CONSTANT AMPLITUDE WAVEFORM WITH HYBRID ORTHOGONAL AND MSK OR GMSK MODULATION

FIELD OF THE INVENTION

The present invention relates to communications systems and, more particularly, the present invention relates to communications systems that use minimum shift keying or Gaussian minimum shift keying modulation.

BACKGROUND OF THE INVENTION

Some multi-band or other tactical radios operate in the high frequency (HF), very high frequency (VHF) (for satellite communications), and ultra high frequency (UHF) bands. The range of these multi-band tactical radios can operate over about 2 through about 512 MHz frequency range. Next generation radios will probably cover about 2.0 to about 2,000 MHz (or higher) to accommodate high data rate waveforms and less crowded frequency bands. This high frequency transmit mode is governed by standards such as MIL-STD-188-141B, while data modulation/demodulation is governed by standards such as MIL-STD-188-110B, the disclosures which are incorporated by reference in their entirety.

UHF standards, on the other hand, provide different challenges over the 225 to about 512 MHz frequency range, including short-haul line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, the disclosure which is incorporated by reference in its entirety. This standard provides a family of constant and non-constant amplitude waveforms for use over satellite links.

The joint tactical radio system (JTRS) implements some of these standards and has different designs that use oscillators, mixers, switchers, splitters, combiners and power amplifier devices to cover different frequency ranges. The modulation schemes used for these types of systems can occupy a fixed bandwidth channel at a fixed frequency spectrum. These systems usually utilize a memoryless modulation, such as phase shift keying (PSK), amplitude shift keying (ASK), frequency shift keying (FSK), quadrature amplitude modulation (QAM), or modulations with memory such as continuous phase modulation (CPM) and may sometimes combine them with a convolutional or other type of forward error correction code.

Minimum shift keying (MSK) and Gaussian minimum shift keying (GSMK) (together referred to as MSK or GMSK) are a form of continuous phase modulation used in the Global System for Mobile communications (GSM). The circuits used for implementing the MSK waveform could include a continuous phase frequency shift keying (FSK) modulator.

Briefly, an MSK modulated signal can be considered as two combined orthogonal signals or channels that are 90 degrees out of phase with each other. Typically, each phase reversal is keyed to represent alternate bits of a binary signal that is to be transmitted. Each keyed pulse period could have a duration of a two bit period that is staggered by a one bit period, and when binary data is used to modulate each channel, the channels can be amplitude modulated with a positive or negative one-half wave sinusoid and combined by addition. Because the sine shaped envelopes of the two channels are 90 degrees out of phase with each other, the sum of the two channels results in a signal with a constant envelope amplitude, which could be amplified by non-linear class-C amplifiers and transmitted. A Gaussian filter having a Gaussian impulse response can be used for prefiltering symbols prior to any continuous phase modulation, thus forming a Gaussian minimum shift keying.

Spread Spectrum (SS) modulation spreads a waveform in frequency and typically provides robust data performance. SS modulation can use underlying orthogonal spreading sequences (i.e., Walsh Hadamard sequences) or pseudo-orthogonal spreading sequences (i.e., sequences obtained from maximum length shift-register sequences, shortened Walsh symbols, overloaded Walsh symbols, gold codes, or others)

Typically, two signals x (t) and y (t) are orthogonal when the average of their product x (t) y (t) equals zero. X (t) and y (t) can be random or Pseudo-random Noise (PN) signals and can be near-orthogonal (i.e., pseudo-orthogonal) with their products being zero in the mean, but sometimes not identically zero for all signal pairs. Any signals transmitted in these spread spectrum system are received and decoded and correlated in matched filters and/or signal processors that correlate a correlation function between a reference signal s(t) and the received signal r(t).

One common example of SS orthogonal data modulation is M-ary Walsh modulation. For example, IS-95 uses a 64-ary orthogonal Walsh modulation combined with PSK to send 6 bits of information. By definition, Walsh symbols are a group of M vectors that contain M binary elements in which every Walsh symbol of a given length is orthogonal to all other Walsh symbols of that length and all inverses of the other Walsh symbols of that length. For example, some systems use Walsh symbols having 64 chips to identify the logic channels. On both the forward and reverse channels the Walsh symbols have orthogonality. Walsh symbols can be produced using a simple iterative technique utilizing a base Walsh matrix.

In present high performance radio network systems, it has been found that better performance can be achieved when robust, burst waveforms are used for the control, status and lower data rate data messages of the network. Many radio network systems, for example, such as manufactured by the assignee of the present invention, have used orthogonal Walsh modulation schemes to achieve the necessary level of robustness. Most radio frequency (RF) power amplifiers are peak power limited, however. For example, average power transmitted for a filtered SS phase shift keying (PSK) waveform can be several decibels (dB) less than the peak power capability of an RF amplifier because of the back-off required to accommodate the waveform's peak-to-average ratio. A constant amplitude waveform would advantageously address this issue, but it is also desirable to maintain robustness.

SUMMARY OF THE INVENTION

In view of the foregoing background, it is therefore an object of the present invention to provide a constant amplitude waveform that provides a desired spectral containment, but is also robust to multipath/fading channels in order to achieve a desired robustness in the control, status and data messages in a radio network as described above.

This and other objects, features, and advantages in accordance with the present invention are provided by a transmitter that is operative for combining SS orthogonal or pseudo-orthogonal data modulation with minimum shift keying or Gaussian minimum shift keying (MSK or GMSK) to create a new, hybrid spread spectrum modulation. The minimum shift keying or Gaussian minimum shift keying modulation provides good spectral containment and constant amplitude. The SS orthogonal data modulation spreads the waveform in frequency and provides robust data performance.

The resulting hybrid modulation has several advantages. It is robust to time and frequency dispersion and has an average power equal to its peak power. A signal modulated in the manner of the present invention can be transmitted with more efficient radio frequency amplifier designs. This signal can also be transmitted at higher power from peak-power limited radio frequency power amplifiers, resulting in a 3 to 4 dB more efficient transmission. A standard RAKE receiver can be used with slight modification to receive this new signal modulation format, making the present invention compatible with many fielded systems.

A system and method for communicating data, in accordance with the present invention, includes a transmitter that transmits a communication signal that carries communications data. It includes a convolutional encoder for encoding the communications data with a forward error correction (FEC) code, for example, a rate ½ convolutional code, an interleaver for reordering the bits out of FEC code, and an orthogonal or pseudo-orthogonal encoder for encoding the FEC and interleaved data with an SS orthogonal or pseudo-orthogonal code to form coded communications data having a specific orthogonal or pseudo-orthogonal symbol. An SS orthogonal or pseudo-orthogonal modulator receives the encoded communications data and forms an SS orthogonally or pseudo-orthogonally modulated and randomized sequence. A minimum shift keying modulator circuit modulates a minimum shift keying or Gaussian minimum shift keying waveform with the SS orthogonally or pseudo-orthogonally modulated and randomized sequence to form a communications signal having a constant amplitude waveform that is spread in time and frequency. A RAKE receiver receives the communications signal from the transmitter and includes a plurality of correlators and output weights formed for processing the communications signal.

The SS orthogonal modulator is operative for M-ary orthogonal Walsh modulation of n symbol frames. A randomizing sequence generator can generate a binary randomizing sequence that is combined with the SS orthogonally modulated and randomized sequence. Similarly, the SS pseudo-orthogonal modulator is operative for M-ary pseudo-orthogonal modulation of n symbol frames. A randomizing sequence generator can generate a binary randomizing sequence that is combined with the SS pseudo-orthogonally modulated and randomized sequence.

A method of the present invention is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is advantageous and provides a transmitter that is operative for combining SS orthogonal or pseudo-orthogonal data modulation with minimum shift keying or Gaussian minimum shift keying (MSK or GMSK) to create a new hybrid spread spectrum modulation. The MSK or GMSK modulation provides excellent spectral containment and constant amplitude. The SS orthogonal data modulation spreads the waveform in frequency and provides robust data performance that can overcome a poor signal-to-noise ratio, channel interference and multipath effects. The resulting hybrid modulation can be robust to time and frequency dispersion and have an average power equal to its peak power. As a result, more efficient radio frequency amplifier designs can be used for transmitting the communications signal using this hybrid modulated waveform, which can also be transmitted at higher power from peak-power limited radio frequency power amplifiers resulting in at least about a 3 to about a 4 decibel increase in average transmit power. Many types of standard RAKE receivers can be used with slight modification to receive this communications signal that has been modulated in the manner of the present invention, making it more compatible with many different fielded systems.

Figure 1:
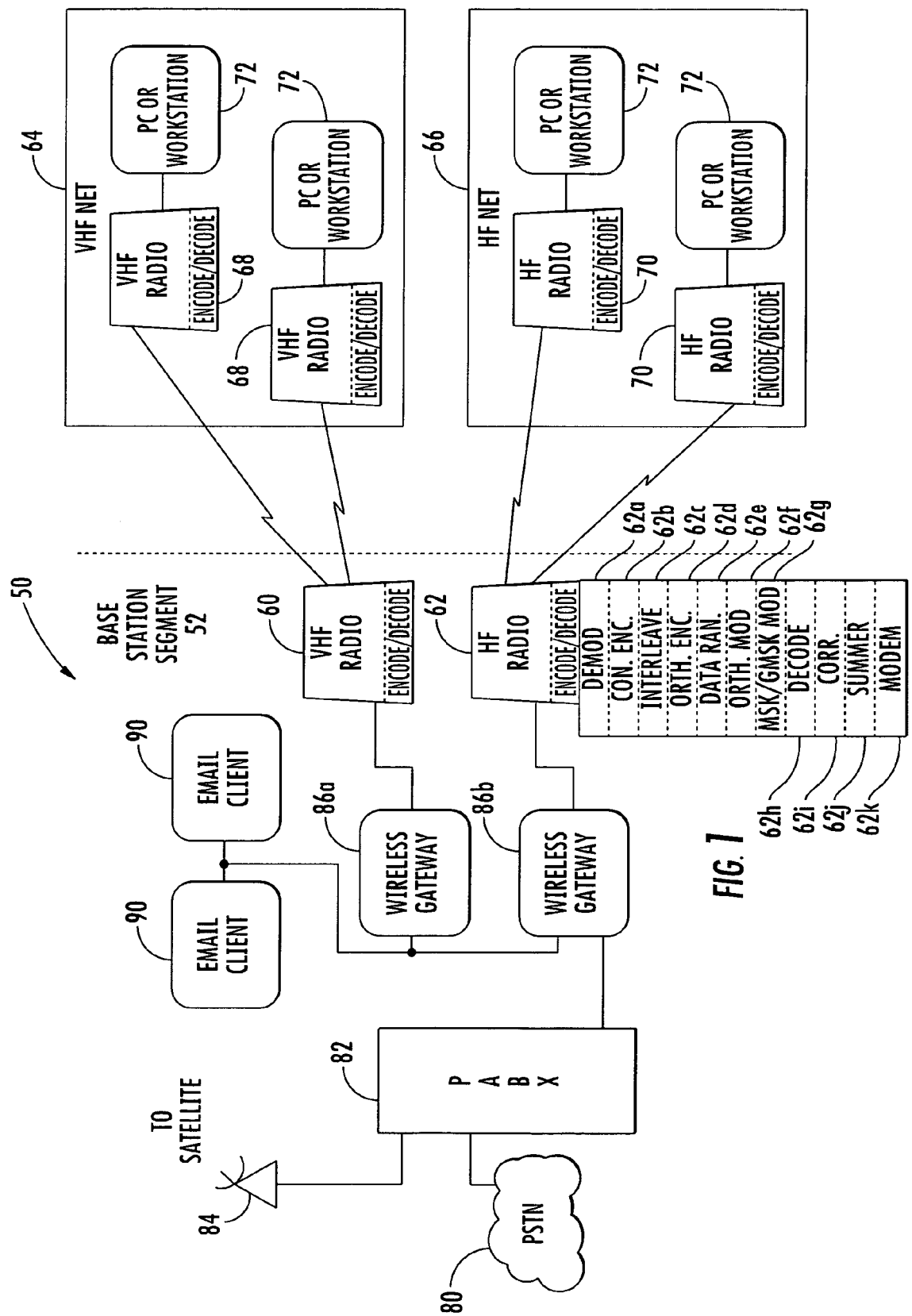
FIG. 1 is a block diagram of a communications system that can be used for the present invention as a non-limiting example.

For purposes of description, some background information of coding, interleaving, and an exemplary radio system that can be used for the present invention is now set forth with regard to the communications system shown in the non-limiting example of FIG. 1. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68, 70. The HF radio can include a demodulator circuit 62a and appropriate convolutional encoder circuit 62b, an interleaver circuit 62c, an orthogonal encoder circuit 62d, a data randomizer circuit 62e, an orthogonal modulation circuit 62f, a MSK or GMSK modulation circuit 62g, a decode circuit 62h, a correlator 62i, a summer 62j, and modem 62k as non-limiting examples. These and other circuits operate to perform the functions necessary for the present invention. Other illustrated radios can have similar circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 2:
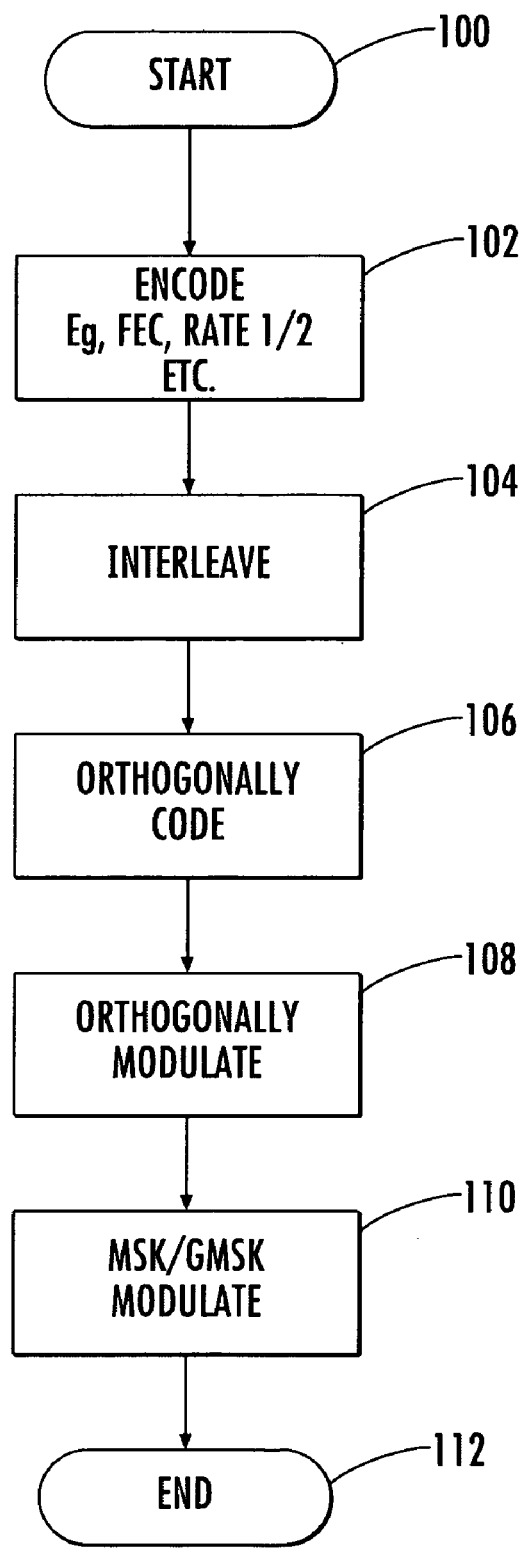
FIG. 2 is a high level flow chart showing basic steps used in implementing an example of the present invention.

FIG. 2 is a high level flowchart of an example of the steps that can be used in the system and method of the present invention. For purposes of description, the blocks begin in the 100 series. The process begins (block 100) and communications data is encoded with a forward error correction code, for example, a rate ½ convolutional code (block 102). The encoded signal is preferably interleaved by an interleaver to spread the signal in time (block 104). Interleaving is not necessary if the signal is not to be spread in time. SS orthogonal coding occurs next (block 106) followed by orthogonal modulation (block 108) and MSK or GMSK modulation (block 110). The process ends (block 112). This hybrid signal provides all the benefits of MSK or GMSK constant amplitude modulation with good spectral containment properties and a waveform that is spread in time (if interleaver used) and frequency with robust data performance. Note that pseudo-orthogonal modulation could have been used instead of orthogonal modulation.

Figure 3:
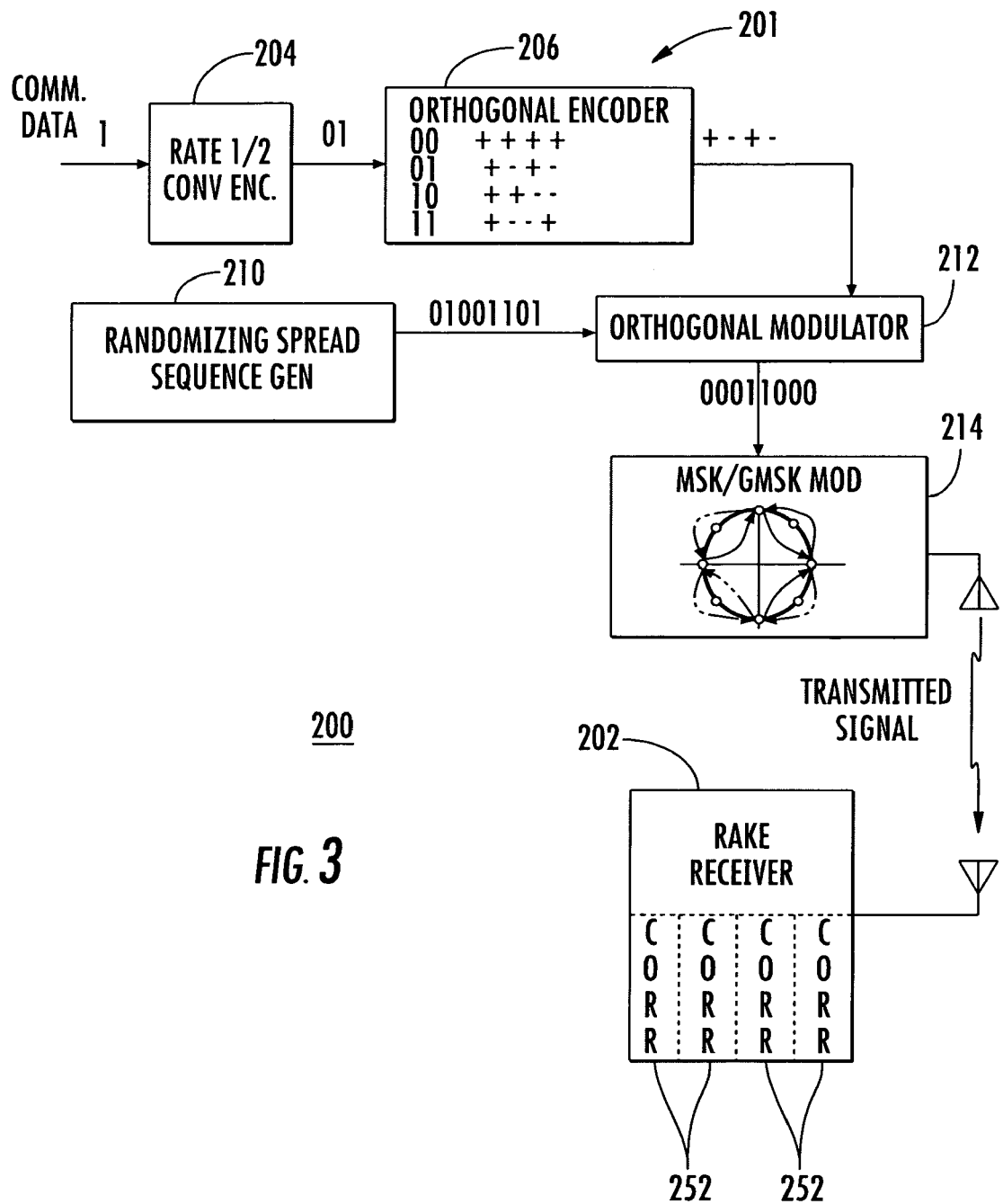
FIG. 3 is a block diagram of a transmitter circuit used for generating the communications signal having the hybrid SS orthogonal and MSK or GMSK modulation in accordance with the present invention, and also showing a block diagram of a RAKE receiver that can receive and process this communications signal.

FIG. 3 shows a communications system 200 and transmitter 201 that has been modified to generate the communications signal that has the constant amplitude waveform with hybrid SS orthogonal and MSK or GMSK modulation, and a RAKE receiver 202 that processes such communications signal. As illustrated in FIG. 1, a convolutional or similar error correction encoder 204 is operable with an orthogonal encoder 206 that generates a Walsh function. A randomizing sequence generator 210 generates an appropriate data code, which is combined within an orthogonal modulator logic circuit 212 with the communications data that has been encoded to produce a SS orthogonally modulated and randomized sequence. This sequence of bits modulates a reference MSK or GMSK waveform with a specific mapping within a MSK or GMSK modulator circuit 214. Thus, a hybrid modulated signal is formed that includes a coupled robust SS orthogonal modulation scheme with the MSK or GMSK modulation. Note that pseudo-orthogonal modulation could have been used instead of orthogonal modulation.

Figure 4:
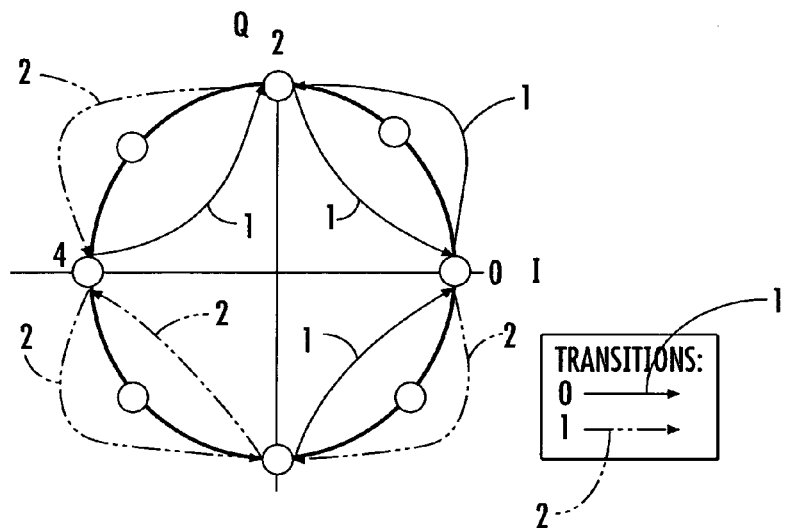
FIG. 4 is a graph showing an example of the special mapping required to convert the bits output from the SS orthogonal or pseudo-orthogonal modulator (after having been randomized) into a MSK or GMSK waveform in accordance with the present invention.

The convolutional encoder 204 encodes the communications data. Output bits from this convolutional encoder 204 (or optionally form the output of an interleaver following FEC encoder) are processed at the SS orthogonal encoder 206 and used to select a specific Walsh symbol. The elements of this orthogonal Walsh symbol are exclusive Or'd (Xor) at the orthogonal modulator 212 with a binary randomizing sequence from randomizing sequence generator circuit 210. This resulting SS orthogonally modulated and randomized sequence modulates the MSK or GMSK waveform at the MSK or GMSK modulator 214, such as with the mapping shown in the graph of FIG. 4, which shows a special mapping required on the data bits to generate the MSK or GMSK symbols. Zero (0) and one (1) transitions are illustrated. A mapping where 1's become 0's and vice-versa or other phase rotations are also allowable. Note that pseudo-orthogonal modulation could have been used instead of orthogonal modulation.

The RAKE receiver 202 can receive and process the communications signal and needs little modification for use with the present invention. The RAKE receiver 202 has all the basic components of a RAKE receiver, including a plurality of correlators 252 forming the RAKE fingers that have output weights that are formed for processing the communications signal with the new modulation. The RAKE receiver can include various components operative with a correlator, including code generators, channel estimators, phase rotators, and delay equalizers. Of course, it should be understood that RAKE receivers 202 use several baseband correlators to process several signal multipath components. The correlator 252 outputs are typically combined to achieve the reliability and performance desired. A wideband signal is received over the multipath channel and multiple delays appear at the RAKE receiver. A "handle" is attached to multipath returns forming the RAKE configuration as understood by those skilled in the art.

Each bank of correlators 252 usually can operate at various delays on a signal and can be summed with the desired weights that are matched to channel taps at the delays. The weights on the correlator outputs can be chosen to obtain the desired configuration of a RAKE receiver to process the hybrid SS orthogonal or pseudo-orthogonal and MSK or GMSK modulation of the present invention. Independent paths can be combined with corresponding channel estimates. The RAKE receiver 202 is also operable for descrambling, despreading, integration and dump, and other functions, as known to those skilled in the art. Channel estimation can be accomplished by data aided (DA), decision directed (DD), or blind channel estimation techniques. Maximum ratio combining can also occur. Coherent or non-coherent demodulation can also be used.

It should be noted that the use of the rate ½ Forward Error Correction (FEC) code and the specific modulation parameters set forth in this non-limiting example are illustrative, and different length of orthogonal symbols such as Walsh symbols or pseudo-orthogonal symbols can be used (2, 4, 8, 16, 32, 64 . . . chips per orthogonal or pseudo-orthogonal symbol) and different number of the orthogonal or pseudo-orthogonal symbols can be used (2, 3, 4, 5, 6, 7, 8, up to the maximum number of chips per symbol) depending on the length of the orthogonal or pseudo-orthogonal symbol symbols. In addition data interleavers and other Forward Error Correction schemes can be used.

The resulting hybrid modulation technique has a number of distinct advantages. First it is robust to time and frequency dispersion. It has an average power equal to the peak power and can be transmitted with more efficient RF amplifier designs. It can also be transmitted at higher power from peak-power limited RF power amplifiers. This can result in a 3-4 dB more average transmitted power.

An example of this modulation technique was simulated using the following parameters:
a) Rate ½ Convolutional FEC;
b) 4.8 second block interleaver defined in US MIL-STD-188-110B main body;
c) 4-ary Orthogonal Walsh Modulation (i.e., 4 Walsh symbols, 2 bits used to select one of the 4 symbols) where each Walsh symbol is 32 chips long; and
d) Simulated for a symbol rate of 2400 symbols/second, noise bandwidth of 3000 Hz.

Figure 5:
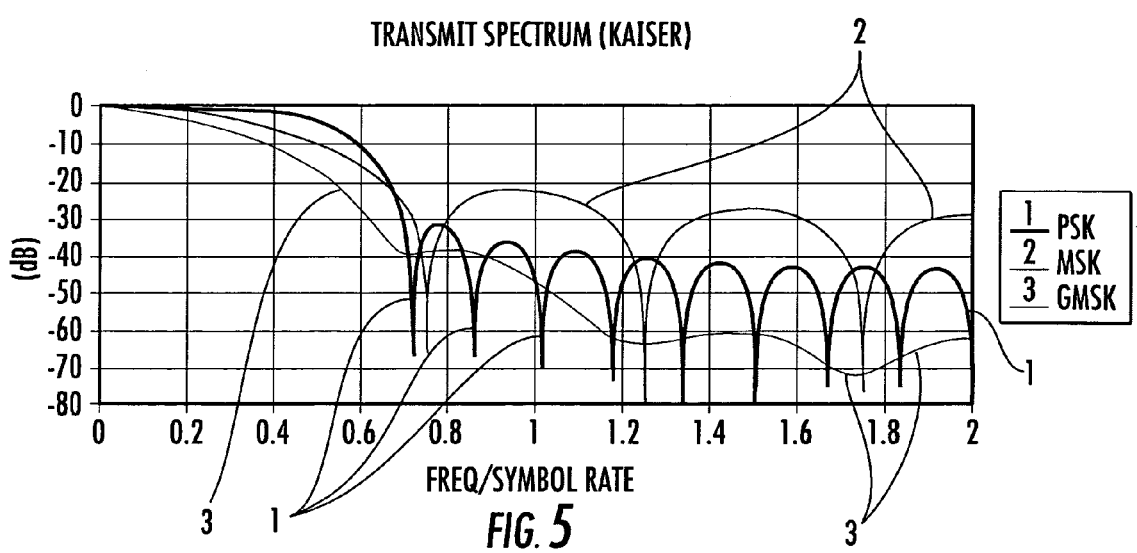
FIG. 5 is a graph showing an example of the transmit power spectrum calculated for standard square-root Nyquist filtered PSK (excess bandwidth=0.35), MSK and GMSK orthogonal modulation.

The transmitted power spectrum was calculated for standard square-root Nyquist filtered PSK (excess bandwidth=0.35), MSK and GMSK and is shown in FIG. 5. In these results, the 99% power bandwidths and the Peak Power/Average Power ratios for the three approaches are:
PSK 1.17 (2803 Hz)–3.6 dB PEP/AVE
MSK 1.27 (3054 Hz)–0 dB PEP/AVE
GMSK 0.90 (2180 Hz)–0 dB PEP/AVE The corresponding bandwidth reduction afforded by the GMSK approach can be beneficial in a number of different ways. The symbol rate could be increased, providing greater throughput by decreasing the transmission time. Alternatively fixed symbols can be inserted for improved channel tracking. Another advantage of the present invention is apparent because a standard orthogonal RAKE receiver structure can be used with slight modification to receive this new modulation format, making it easily compatible with many fielded systems.

Figure 6:
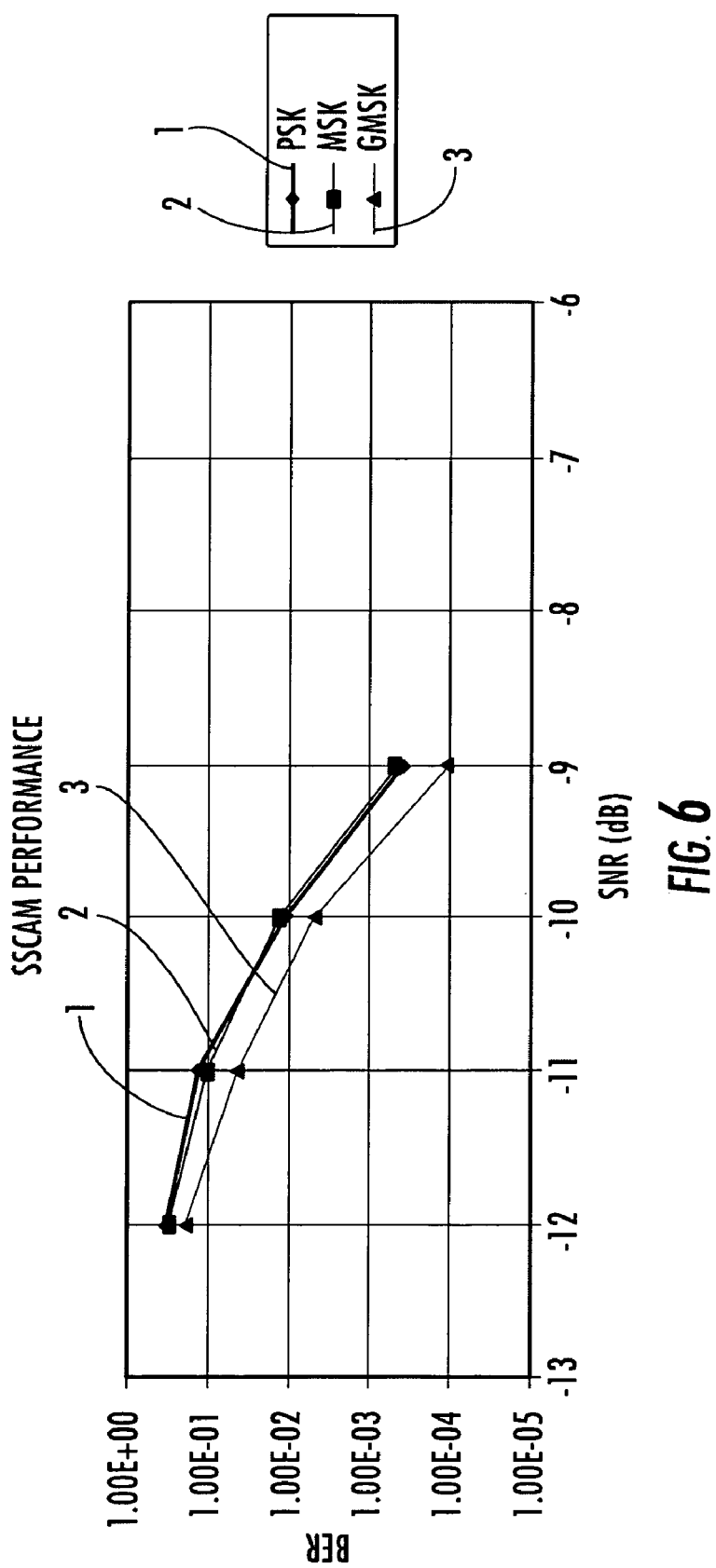
FIG. 6 is a graph showing the performance of the SS orthogonal MSK and GMSK modulation in accordance with the present invention when compared with an existing SS PSK approach used in US MIL-STD-188-110B and showing Bit Error Rate (BER) relative to the Signal-to-Noise (SNR) ratio (dB).

FIG. 6 illustrates the performance of this new modulation technique of the present invention compared with an existing standard PSK approach. It can be seen that the new technique does not cause any degradation in performance.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for communicating data, which comprises:
an encoder and interleaver circuit for encoding and interleaving communications data to be transmitted with a forward error correction code and an orthogonal code to form a communications signal;
a spread spectrum (SS) orthogonal or pseudo-orthogonal modulator for receiving the communications signal and forming a SS orthogonally or pseudo-orthogonally modulated and randomized sequence; and
a modulator circuit for modulating a Gaussian minimum shift keying waveform with the SS orthogonally modulated and randomized sequence using a specific mapping algorithm and at least one of an (a) increased symbol rate and (b) inserted fixed symbols to form a communications signal having a constant amplitude waveform that is spread in time and frequency.

2. A system according to claim 1, wherein said encoder and interleaver circuit comprises a convolutional encoder and an orthogonal encoder.

3. A system according to claim 2, wherein said SS orthogonal modulator is operative for M-ary orthogonal Walsh modulation of n chips per Walsh symbol.

4. A system according to claim 3, wherein said SS orthogonal modulator is operative for modulating the communications data using a different number of orthogonal Walsh symbols.

5. A system according to claim 1, and further comprising a randomizing sequence generator for generating a binary randomizing sequence that is combined with encoded communications data.

6. A system according to claim 1, and further comprising a RAKE receiver having a plurality of correlators and output weights formed for processing the communications signal.

7. A system according to claim 1, wherein said encoder and interleaver circuit is operative for encoding with a turbo code, iterative block code, low density parity check code or Reed-Solomon code.

8. A system for communicating data, which comprises:
a transmitter for transmitting a communications signal that carries communications data, and including a convolutional encoder for encoding the communications data with a forward error correction code, an interleaver, and an orthogonal encoder for encoding the communications data from the convolutional encoder with an orthogonal code to form encoded communications data;
an orthogonal or pseudo-orthogonal modulator for receiving the encoded communications data and a binary randomizing sequence and forming an orthogonally or pseudo-orthogonally modulated, randomized and spread sequence;
a modulator circuit for modulating a Gaussian minimum shift keying waveform with the orthogonally or pseudo-orthogonally modulated, randomized and spread sequence using a specific mapping algorithm and at least one of an (a) increased symbol rate and (b) inserted fixed symbols to form a communications signal having a constant amplitude waveform that is spread in time and frequency; and a RAKE receiver for receiving the communications signal from the transmitter, and including a plurality of correlators and output weights formed for processing the communications signal.

9. A system according to claim 8, wherein said orthogonal or pseudo-orthogonal encoder is operative for M-ary orthogonal Walsh modulation of n chips per Walsh symbol.

10. A system according to claim 8, wherein said orthogonal or pseudo-orthogonal modulator is operative for modulating the communications data using a different number of orthogonal Walsh symbols.

11. A system according to claim 8, and further comprising a randomizing sequence generator for generating a binary randomizing sequence that is combined with said orthogonally modulated, spread sequence.

12. A method of communicating data, which comprises:
modulating communications data to be transmitted by combining an orthogonal Walsh modulation with a Gaussian minimum shift keying waveform using a specific mapping algorithm and at least one of an (a) increased symbol rate and (b) inserted fixed symbols to form a communications signal that carries the communications data over a constant amplitude waveform that is spread in time and frequency; and
transmitting the communications signal to a receiver.

13. A method according to claim 12, which further comprises receiving the communications signal within a RAKE receiver having a plurality of correlators and output weights formed for processing the communications signal.

14. A method according to claim 12, which further comprises encoding the communications data using a convolutional encoder and an orthogonal encoder.

15. A method according to claim 12, which further comprises modulating the communications using different number of Walsh symbols.

16. A method according to claim 12, which further comprises combining an orthogonal Walsh function with a binary randomizing sequence.

17. A method according to claim 12, which further comprises encoding with a turbo code, iterative block code, low density parity check code, or Reed-Solomon code.

18. A method of communicating data, which comprises:
encoding communications data with forward error correction and orthogonal codes;
combining a specific Walsh function with a binary randomizing sequence to form an orthogonally modulated, randomized and spread sequence of the communications data;
modulating a Gaussian minimum shift keying waveform with the orthogonally modulated, randomized and spread sequence using a specific mapping algorithm and at least one of an (a) increased symbol rate and (b) inserted fixed symbols to form a communications signal that carries the communications data over a constant amplitude waveform that is spread in time and frequency; and
transmitting the communications signal to a receiver.

19. A method according to claim 18, which further comprises encoding the communications data using a convolutional encoder.

20. A method according to claim 18, which further comprises selecting specific Walsh symbols from the outputs of the convolutional encoder.

21. A method according to claim 20, which further comprises using output bits from the convolutional encoder for selecting a Walsh symbol.

22. A method according to claim 18, which further comprises encoding with a rate ½ forward error correction (FEC) code.

23. A method according to claim 18, which further comprises modulating the communications using different numbers of Walsh symbols.

24. A method according to claim 18, which further comprises receiving the communications signal within a RAKE receiver having a plurality of correlators and output weights formed for processing the communications signal.

* * * * *